Jan. 31, 1928.
G. A. PETERSON
EYE PROTECTOR
Filed Jan. 11, 1924
1,657,899
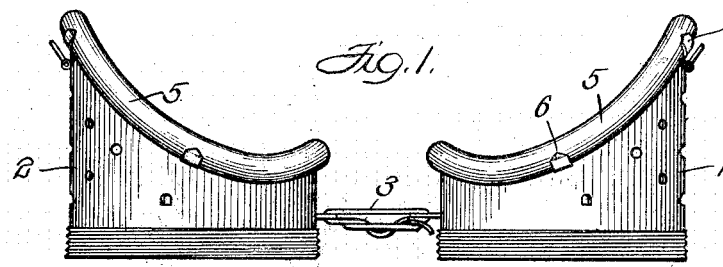
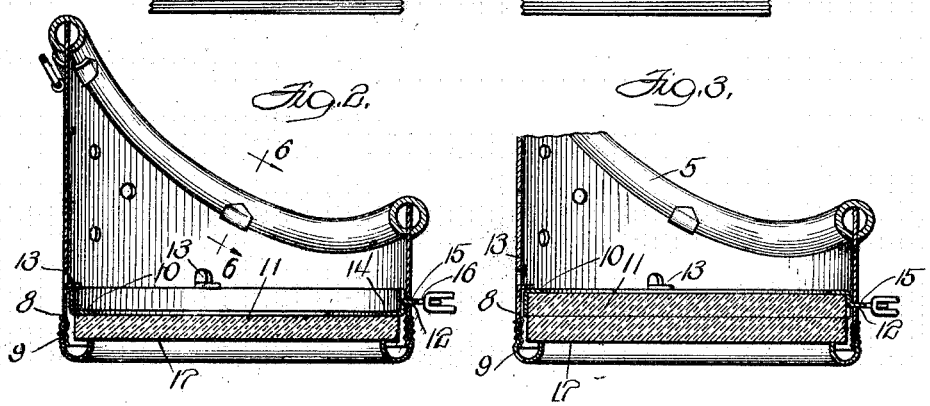
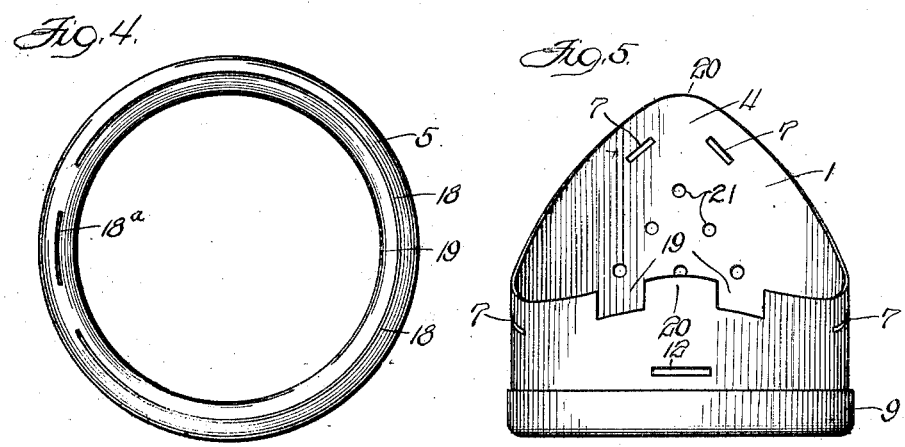

Patented Jan. 31, 1928.

1,657,899

UNITED STATES PATENT OFFICE.

GUST A. PETERSON, OF CHICAGO, ILLINOIS; GEORGIA PETERSON, ADMINISTRATRIX OF SAID GUST A. PETERSON, DECEASED, ASSIGNOR OF ONE-HALF TO GUST E. SELLSTROM, OF CHICAGO, ILLINOIS.

EYE PROTECTOR.

Application filed January 11, 1924. Serial No. 685,521.

My invention relates to eye protectors and it has special reference to such devices as are used extensively by mechanics and workmen whose eyes are exposed to dust, dirt and metal shavings and the like, or who work with electric welding apparatus or acetylene welding torches and desire to protect their eyes by means of filtering lenses from the deleterious and harmful rays emanating from the electric arc.

An object of my invention is to provide an eye protector for the character of work indicated above or which will serve as an eye goggle of general utility to afford protection against the sun, rain, wind, etc.

Another object of my invention is to provide an eye protector or goggle that permits of the use of lenses of different thicknesses, such lenses being readily placed in position and held firmly in the goggle without requiring any special fittings or accessories dependent upon the particular thickness of the lens that may be selected.

Another object of my invention is to provide an eye protector or goggle that may be made from thin light parts which are readily assembled into a complete protecting goggle without the use of any special tools or special operations such as heretofore have been employed in manufacturing the former types of goggles.

Another object of my invention is to provide a goggle in which the portion of the eye cup that is in contact with the wearer's face is protected with a sanitary cushion that is removably secured to the peripheral border of the eye cup without the usual stitching that has heretofore been required in attaching such cushions to goggles.

A further object of my invention is to provide an eye protector or goggle which is strong and durable in construction and which is economical to manufacture, at the same time providing means whereby lenses of different thicknesses may be readily inserted into the goggles without requiring any special adjustments.

For a better understanding of the nature, scope and characteristic features of my invention, reference may be had to the following description and the accompanying drawing, in which—

Figure 1 is a view in elevation of a pair of eye goggles or eye protectors embodying one form of my invention;

Fig. 2 is an enlarged sectional view of one of the eye protectors of Fig. 1 showing a relatively thin lens received within the eye cup;

Fig. 3 is a view similar to that of Fig. 2 in which a relatively thick lens is received within the eye cup;

Fig. 4 is a plan view of the flexible tubular cushion that is applied to the peripheral border of the eye cup that is adjacent to the wearer's face;

Fig. 5 is a view in elevation showing a form of my eye cup in which the peripheral border adjacent to the wearer's face is notched to be received by the longitudinally slitted tubular cushion of Fig. 4; and Fig. 6 is a sectional view taken along the line 6—6 of Fig. 2 illustrating the method by which the flexible cushion is held in position upon the peripheral border of the eye cup.

Referring to the drawings, a pair of goggles is illustrated as comprising two similar eye cups 1 and 2 that are connected together by means of an adjustable strap 3 serving as a nose piece. Each of the eye cups 1 and 2 may be formed as shown in Fig. 5 from a cylindrical tubular member having one of its peripheries curved to form an elongated side portion 4 to constitute a protecting shield for the eye. The other periphery of the tubular eye cup 1 and 2 is cut square in order to form a circular opening in which the lens is received. Each eye cup 1 and 2 is provided at the periphery adjacent to the wearer's face with a removable sanitary cushion 5 held in position upon the peripheral border by means of removable spaced clips 6 that project through spaced slots 7 formed adjacent to the peripheral border.

As shown in Figs. 2 and 3, the outer periphery of each eye cup is exteriorly threaded at 8 in order to engage with a threaded lens-supporting member 9. A lens-holding frame 10 is received within the eye cup 1 or 2 and supports the lens 11. When the lens-holding frame 10 occupies the position shown in Fig. 2, a relatively thin lens 11 may be positioned within the eye cup and when the frame 10 occupies the position shown in Fig. 3, a relatively thick lens 11 may be positioned within the eye cup.

Each of the eye cups 1 and 2 is provided with a slot 12 adjacent to the nose piece 3 and properly positioned to permit of the lens-supporting member 9 to be screwed always in the same position upon the eye cup. A plurality of spaced upstanding lugs 13 are also formed in each eye cup as shown in Figs. 2 and 3, these projections extending inwardly in order to provide, in the aggregate, a firm seat upon which the lens-holding frame 10 may rest when it occupies either the position shown in Fig. 2 or the position shown in Fig. 3. The lens-supporting frame 10 is a circular member having an inwardly laterally extending flange 14 formed on one of its peripheries and provided with a projecting portion 15 which is adapted to pass through the slot 12 formed in the eye cup. The projecting portion 15 is also provided with an opening 16 through which the strap 3 of the nose piece may pass. The positioning of the projecting portion 15 upon the lens-holding frame 10 and the relation between the slot 12 and the lugs 13 are determined by the two thicknesses of lens that the eye cup is adapted to receive. In the particular eye cups illustrated in the drawings, the lens 11 of Fig. 2 is one-half of the thickness of the lens 11 of Fig. 3, and, in this instance, therefore, the projecting portion 15 of the lens-holding frame 10 is placed mid-way between the upper and lower edges of the frame 10. It is evident that lens of other relative dimensions may be accommodated by the proper location of, and relation between the lens-holding frame 10 with its projecting portion 15 and the eye cup with the slot 12 and lugs 13.

While I have shown the lugs 13 as providing a seat for the lens-holding frame 10, it is apparent that other means may be substituted for the lugs 13, such as rivets or a spun bead. The particular mode of forming the seat for the lens-holding frame 10 is not essential and any expedient may be adopted which will provide a suitable seat for the frame 10.

When the lens-holding frame 10 occupies the position shown in Fig. 2, it will be noted that the thin periphery of the frame 10 is seated upon the lugs 13 thereby placing the outer face of the flange 14 in immediate contact with the lens 11 which, in this instance, is a relatively thin lens. As a result, the lens 11 is held in spaced position from the lugs 13. The lens-supporting member 9 is then screwed upon the eye cup and an inwardly projecting rim 17 formed upon the lens-supporting member makes close contact with the outer face of the lens 11.

In Fig. 3, the lens-holding frame 10 is inverted thereby placing the flange 10 in immediate contact with the lugs 13. The relatively thick lens 11 is then received within the lens-holding frame 10 in order that the inner face of the flange 14 may contact with the inner face of the lens. The lens-supporting member 9 is then screwed upon the eye cup and the flange 17 again engages the outer surface of the relatively thick lens 11. From the foregoing description, it will be obvious that by inverting the lens-holding frame 10, a relatively thick lens may be received therein.

The two positions that I devise for the lens-holding frame 10, as shown in Figs. 2 and 3, accommodate lenses of two different thicknesses and this is a highly desirable result since with my improved goggles, lenses of different thicknesses may be positioned in the goggles thereby adapting them for a number of uses which heretofore have required a plurality of goggles in order to permit of the use of lenses of different thicknesses.

While I have shown the lens of Fig. 3 as being a single lens, it is obvious that I may substitute therefor a plurality of lenses that in the aggregate serve as the equivalent of a single unitary lens.

The sanitary cushion 5 is formed from a flexible tubular member that may be made of a woven fabric, an impregnated compound, rubber or other suitable material. In order to attach the cushion 5 to the peripheral border of the eye piece that is immediately adjacent to the wearer's face, the cushion 5 is longitudinally slitted, as shown at 18, in order to receive the peripheral border of the eye piece.

In Fig. 5 I have shown the peripheral border of the eye piece adjacent to the wearer's face as being provided with spaced notches 19 leaving an intermediate inner central portion 20. The part of the eye cup having the portions 19 and 20 is closely adjacent to the eye of the wearer and when the cushion 5 is placed on the peripheral border of the eye piece, it is highly desirable to prevent the cushion from flaring, otherwise the cushion would be an annoyance and a probable impediment to the eye sight of the wearer. Consequently, the tubular cushion is not slit its entire length but the central slit $18^a$ is bounded on both sides by unslitted portions that are adjacent to the notches 19. The unslitted portions of the cushion 5 prevent the cushion from flaring at this point on the border of the eye piece. A longitudinal slit $18^a$ is formed in the cushion 5 in order to receive the intermediate portion 20 of the peripheral border of the eye cup. In applying the flexible cushion 5 to the peripheral border, the intermediate portion 20 of the eye cup is received in the slit $18^a$, the recessed portions 19 permitting of the cushion 5 to be kept intact at the points opposite to the notches 19. The remainder of the peripheral border of the eye cup is received in the longitudinal slit 18. The junction 19 is formed at the top of the peak 20 of the longitudinal projecting side portion 4 of the eye cup.

Flexible clips 6 are then passed through the slots 7, as shown in Fig. 6, and the ends of these clips are forced inwardly in order to engage firmly the flexible cushion 5 thereby holding it in position upon the eye cup. It is obvious that the clips 6 are readily removable and that the cushion 5 may then be replaced by a new cushion thus ensuring that a sanitary cushion may be retained in contact with the wearer's face. At the same time, the clips 6 serve to hold the cushion 5 in position and preclude it from becoming detached while the goggles are in use. The ease of removing the cushion 5 from the eye cup is advantageous over the old form of goggles in which cushions heretofore have been applied to the eye cups by stitching them thereto with the aid of machines. This stitching process for securing a cushion to the eye cup of goggles has been a rather expensive one requiring that the goggles be returned to the repair shop when it was desired to apply a clean cushion. By means of my present invention, the cushions may be readily removed by a workman himself and clean cushions applied with very little time or effort.

As is common practice in protective goggles, I have provided a series of ventilating holes 21 in each eye cup which are shown punched out as openings but which may be punched slits or shutters or the like as are customary in the manufacture of protective goggles.

While I have shown and described an embodiment of my invention, it is to be understood that I do not desire to be limited to the specific structures illustrated since my invention comprehends an eye protector or goggle that is limited only by the scope of the appended claims.

What I claim as new and desire to secure by Letters Patent of the United States is:

1. An eye protector comprising two eye cups, a removable and invertible lens-holding frame engaging each of said eye cups whereby lenses of different thicknesses may be received therein, means for retaining in position lenses of different thicknesses in each of said eye cups, and means for forming a nose piece for the eye protector irrespective of the position of said invertible lens-holding frames.

2. An eye protector comprising two eye cups, a removable lens-holding frame in each eye cup telescoping thereinto and invertible to receive lenses of different thicknesses, a lens-supporting member screwed to said eye cup for retaining in position said lens-holding frame and lenses in said eye cup, and means for forming a nose piece for the eye protector irrespective of the position of said invertible lens-holding frames.

3. An eye protector comprising two eye cups, a removable and invertible lens-holding frame engaging each of said eye cups whereby lenses of different thicknesses may be retained in position in each of said eye cups, and means for forming a nose piece for the eye protector irrespective of the position of said invertible lens-holding frames.

4. An eye protector comprising an eye cup having supporting lugs, a removable and invertible lens-holding frame engaging said lugs and provided with a flange on one of its edges whereby a lens of one thickness may engage said flange on its outer surface and a lens of another thickness may engage said flange on its inner surface, and a lens-supporting member for firmly retaining said lenses of different thicknesses in said eye cup.

5. An eye protector comprising an eye cup having a slot formed adjacent to the nose piece and provided with supporting means, a removable and invertible lens-holding frame engaging said supporting means and having an extension projecting through said slot when said lens-holding frame is operatively positioned, said slot being positioned to permit said extension to remain in fixed position irrespective of the position of the lens-holding frame, thereby comprising a nose piece for the eye protector, and a lens-supporting member engaging said eye cup for retaining said lens-holding frame in said eye cup.

6. An eye protector comprising an eye cup provided with supporting lugs and a slot formed adjacent to the nose piece, a removable and invertible lens-holding frame engaging said lugs and having an extension that is adapted to project through said slot said lens-holding frame being provided with a flange on one of its edges whereby in one position of said frame a relatively thin lens may engage said flange on its outer surface and in another position of said frame a relatively thick lens may engage said flange on its inner surface, and a lens-supporting member removably attached to said eye cup and adapted to hold firmly the selected lenses in said eye cup.

7. An eye protector comprising an eye cup having supporting means and a slot formed therein adjacent to the nose piece, an invertible and removable lens-holding frame received in said eye cup and supported upon said supporting means, said frame being provided with an extension that projects through said slot in the eye cup when said frame occupies either position, said slot being positioned to permit said extension to remain in fixed position irrespective of the position of the lens-holding frame, thereby comprising a nose piece for the eye protector, and an exteriorly removable lens-supporting member for holding a lens in said eye cup.

8. An eye protector comprising an eye cup having a peripheral border adapted to contact with the wearer's face, a removable sanitary cushion binding said border of the eye cup, and removable spaced clips projecting through said eye cup and engaging said cushion to hold the latter in position.

9. An eye protector comprising an eye cup having a peripheral border adjacent to the wearer's face, a sanitary cushion formed from a flexible longitudinally slitted tubular casing, the peripheral border of said eye cup being received through the slit in said casing, and removable spaced clips projecting through said eye cup and engaging said cushion to hold it in position.

10. An eye protector comprising an eye cup having a peripheral border adjacent to the wearer's face and provided with spaced slots adjacent to said border, a removable cushion binding said border, and removable clips passing through said spaced slots in the eye cup for removably securing said cushion in position.

11. An eye protector comprising an eye cup having a peripheral border adjacent to the wearer's face and provided with a notch on each side of the inner central portion of the eye cup, said eye cup having spaced slots formed therein adjacent to said border, a cushion engaging said peripheral border and formed from a flexible tubular casing which is longitudinally slitted at points corresponding to the projections formed intermediate said spaced notches formed in the peripheral border thereby keeping said flexible tubular casing intact at points opposite to said spaced notches in order to preclude flaring of said casing, and removable clips passing through said spaced slots and engaging said cushion for holding the latter in position.

In witness whereof, I have hereunto subscribed my name.

GUST A. PETERSON.